United States Patent
Reisinger et al.

[11] Patent Number: 6,064,991
[45] Date of Patent: May 16, 2000

[54] INTERCHANGEABLE POSTAGE CALCULATING MODULE AND METHOD FOR DATA TRANSMISSION

[75] Inventors: Frank Reisinger, Oranienburg; Olaf Turner, Berlin, both of Germany

[73] Assignee: Francotyp-Postalia AG & Co., Birkenwerder, Germany

[21] Appl. No.: 08/858,380

[22] Filed: May 19, 1997

[30] Foreign Application Priority Data

May 21, 1996 [DE] Germany .................. 196 22 304

[51] Int. Cl.[7] .................................................. G07B 17/00
[52] U.S. Cl. .......................................................... 705/401
[58] Field of Search ........................ 395/651, 652, 395/653; 705/401, 402, 409; 713/1, 2, 100

[56] References Cited

U.S. PATENT DOCUMENTS

| | | | |
|---|---|---|---|
| 4,084,242 | 4/1978 | Conti ............................... | 705/407 |
| 4,138,735 | 2/1979 | Allocca et al. ................... | 705/409 |
| 4,286,325 | 8/1981 | Dlugos et al. .................... | 705/402 |
| 4,320,461 | 3/1982 | Dlugos ............................. | 705/410 |
| 4,516,209 | 5/1985 | Scribner .......................... | 705/406 |
| 4,718,506 | 1/1988 | Hills ................................ | 177/25.15 |
| 4,900,904 | 2/1990 | Wright et al. .................... | 235/381 |
| 5,337,246 | 8/1994 | Carroll et al. .................... | 705/402 |
| 5,608,636 | 3/1997 | Guenther ......................... | 705/408 |
| 5,699,258 | 12/1997 | Thiel ............................... | 705/409 |
| 5,710,706 | 1/1998 | Märkl et al. ..................... | 705/409 |
| 5,731,980 | 3/1998 | Dolan et al. ..................... | 705/410 |
| 5,852,813 | 12/1998 | Guenther et al. ................ | 705/408 |

FOREIGN PATENT DOCUMENTS

0 099 666  7/1989  European Pat. Off. .

*Primary Examiner*—Edward R. Cosimano
*Attorney, Agent, or Firm*—Hill & Simpson

[57] ABSTRACT

An interchangeable postage calculating module and a corresponding method for data transmission to a basic device such as a postage meter machine or a scale, allow a high degree of flexibility in accommodating future changes in postage calculation formats and techniques. The interchangeable postage calculating module is fashioned as a postage fee and calculation module that the customer can replace or plug into the basic device, and contains an internal processing unit and a non-volatile memory for the calculating program and for postage fee schedule table data. The module is programmed to supply data for at least one carrier from the interchangeable postage calculating module for display modification in the basic device on the basis of user inputs with respect to service demands made on a carrier and for processing the supplied data in the basic device, to receive weight data and shipping data for a piece of mail, to calculate postage value on the basis of the postage fee schedule table data and calculating structure of the desired carrier in the interchangeable postage calculating module, and to supply data including the postage value of at least one carrier from the interchangeable postage calculating module for carrier-related processing of the supplied data in the basic device.

20 Claims, 7 Drawing Sheets

| | BYTES |
|---|---|
| SEQUENCE START | |
| COMMAND "CALCULATE POSTAGE" | |
| LENGTH OF PARAMETER LIST | |
| CARRIER ID | |
| WEIGHT | |
| SHIPPING PARAMETER | |
| " | |
| " | |
| " | |
| " | |
| " | |
| DIMENSIONS | |
| CHECK SUM | |
| SEQUENCE END | |

FIG. 9

| | BYTES |
|---|---|
| SEQUENCE START | |
| LIST TYPE ID | |
| ERROR STATUS | |
| LENGTH OF PARAMETER LIST | |
| POSTAGE MSB | |
| POSTAGE | |
| " | |
| DECIMAL POINT | |
| POSTAGE | |
| " | |
| " | |
| SHIPPING PARAMETER | |
| " | |
| " | |
| " | |
| " | |
| CHECK SUM | |
| SEQUENCE END | |

FIG. 10

| | BYTES |
|---|---|
| SEQUENCE START | |
| COMMAND "CLEARTEXT SHIPPING FORM" | |
| IDENTIFIER COMPATIBILITY | |
| CARRIER ID | |
| LENGTH OF PARAMETER LIST | |
| WEIGHT | |
| SHIPPING PARAMETER | |
| " | |
| " | |
| " | |
| " | |
| DIMENSIONS | |
| CHECK SUM | |
| SEQUENCE END | |

FIG. 11

| | BYTES |
|---|---|
| SEQUENCE START | |
| LIST TYPE ID | |
| CARRIER ID | |
| ERROR STATUS | |
| NUMBER OF TEXTS (EXAMPLE = 2) | |
| LENGTH OF TEXT 1 | |
| ASCII TEXT 1 | |
| " | |
| " | |
| " | |
| END OF TEXT ID | |
| LENGTH OF TEXT 2 | |
| ASCII TEXT 2 | |
| " | |
| " | |
| " | |
| END OF TEXT ID | |
| CHECK SUM | |
| SEQUENCE END | |

INTERCHANGEABLE POSTAGE CALCULATING MODULE AND METHOD FOR DATA TRANSMISSION

BACKGROUND OF THE INVENTION

1. Field of the Invention

The present invention is directed to an interchangeable postage calculating module and to a corresponding method for data transmission between postage calculating module and a basic device.

2. Description of the Prior Art

A postage calculating module can be used in postage scales and postage meter machine or similar basic devices wherein a debiting takes place.

A number of methods are already known for making postage calculating tables in postage calculating scales interchangeable or reloadable. U.S. Pat. No. 4,506,330 discloses a postage table with switches for address switching stored in a PROM on a removable printed circuit board.

U.S. Pat. No. 3,635,297 discloses a similar interchangeable postage memory table stored in ROMs. The ROM are connected to a parallel bus in order to enable a fast access of a processor thereto.

European Application 0 099 666 likewise discloses a system that operates with a fixed processor and interchangeable fee schedule table memories.

Such solutions with conventional postage structure are flexible only with respect to the table size. In the case of expansions or modifications of fee schedules, the read-only memory with the postage fee schedule table is simply replaced by one having more memory capacity. It is disadvantageous, however, that such replaceable read-only memories are interpreted according to a permanently stored program by the processor in the basic device. Such solutions are therefore restricted to conventional postage structure elements of the program and are inflexible with respect to new postage structure elements. A further disadvantage when accessing the read-only memories with an extensive postage fee schedule table is that adequate speed when accessing requires the use of an expensive interface that must has a number of PINs.

Beginning with a moderate through higher number of letters or other postal matter to be sent, postage meter machines are used in a standard way for franking the postal matter. A postage meter machine is equipped with a control unit, memory means, an input means, a modem or other data reception means, an input/output control means, a display means and a printer, with a prepaid credit balance non-volatilely stored in the memory means. Generally, the control unit CPU is also responsible for the administration of the monetary data, and the postage meter machine is provided with suitable security means. After the subtraction of the determined postage value from the aforementioned credit balance, a stationary print head prints the franking impression column-by-column given simultaneous transport of the letter. A printing width of approximately 1 inch is thereby achieved.

U.S. Pat. No. 4,802,218 primarily discloses methods for chip-card-based accounting of a franking system but also discloses the use of a further chip card on which the current postage fee schedule table is stored. The program of the franking system uses this postage fee schedule table for determining the postage value. Again, however, the serial interface to the chip card with the postage fee schedule table proves to be a bottleneck for processing optimization.

Methods that are not limited to accessing the external read-only memory immediately during the postage calculation, but also can copy or load the current postage fee schedule table into an internal memory area in advance are suitable for avoiding this disadvantage. European Application 0 560 717 discloses a loading plug for such a method for a postage meter machine that includes an internal postage calculator. The fee schedule memory built into the internal postage calculator can be updated subsequently by the user by plugging a loading plug with the new postage table at the exterior of the postage meter machine. The content of the plug is copied into the internal memory of the computer after the actuation of command input means. The user, however, must attend to the loading, including insuring that the internally stored table data are current at all times. Flexibility with respect to future modifications is only available with respect to the table size to the extent that internal memory space therefor was previously planned in.

The postage fee tables are updated from time to time by the mail carrier. Generally, the fees for specific carrier services are thereby raised. Taking all future modifications that are possible into account using a loading plug or by replacement of read-only memories, however, will become more difficult in the future because there is no flexibility with respect to new postage calculating structures, which it must be assumed will be developed As long as postage meter machines are provided for accounting with one carrier (heretofore, the national (governmental service), the expiration of the old postage fee schedule tables and the necessity of reloading a new table is a procedure that is still monitorable by the manufacturer and the customer, particularly when the postage structures are preserved even though the valves change. A data center remote from the user and the use's postage meter machine can also initiate the communication of a current table, as disclosed in German OS 28 03 982. The postage calculating devices of all customers, however, then must be equipped with a modem or comparable transmission means and must always be kept ready to receive a communication of the updating data. Structure changes cannot be taken into consideration in the calculation. Such a method can also not individually load a specific(different) set of suitable carriers into the postage calculating device for each customer.

U.S. Pat. No. 5,490,077 discloses another method that automatically checks the current status of the internally stored table data after every turn-on of the postage meter machine. Each transmission means thereby requires specific reception or input means. Mobile radiotelephone reception/transmission means are required in a mobile radiotelephone version, a modem is required in an ISDN version and a chip card reader unit is required in a chip card version.

Rapidity in the data access is not necessarily required during loading given all of these loading or copying methods, but such solutions are still inflexible with respect to a fee schedule modification that results in a significantly enlarged fee schedule table, and do not allow any adaptation to a new postage calculation structure.

There is still a need for a postage meter machine which flexibility with respect to the accounting vis-a-vis various carriers. An economically beneficial service would then be selectable from among respective valid (current) fee schedule structures of different carriers. When, however, the postage meter machine is configured for accounting vis-a-vis a number of different carriers, a specific solution must also be created so that the postage fee table valid for the selected carrier is always available. A prerequisite therefor is that adequate memory space be made available in for the different carrier-related fee schedules. It is conceivable, however, that new private carriers in the marketplace which function regionally, nationally or internationally will have postage structures that deviate entirely from previous structures and thus cannot be accommodate in the tables so that the unmodified, old interpretation program could calculate the postage value therefrom. The national postal service as well as private carriers could fundamentally define new postage calculating structures of the fees. In the updating, thus, the interpretation program would also have to be replaced, which raises security considerations specifically in postage meter machines because a program code executed by the postage meter machine computer must always be fashioned according to specific security criteria to guard against manipulation of the monetary data stored in the postage meter machine. The program routines or modifications that are fed in cannot diminish the security against data manipulation. From the viewpoint of the carriers, every possibility for the user to externally reload a program code into the postage meter machine represents an unacceptable security risk because it cannot be precluded that software for the purpose of manipulating the monetary data will be introduced in this way with fraudulent intent. Even if, deviating from the above-recited method, a service technician were to install the new program parts (installation program), fundamental difficulties derive for such an installation procedures, in addition to the costs. The memory space required in the internal memory area for accommodating future postage calculating structures is difficult to plan in advance, and thus the aforementioned installation procedure can still fail under certain circumstances.

SUMMARY OF THE INVENTION

An object of the present invention is provide a storage and method and calculating arrangement for determining postage fees using an interface which require only a small dataset to be transmitted, and which avoid the aforementioned disadvantages of known arrangements and methods.

The method and arrangement should allow an easy modification of a carrier-specific and/our country-specific postage structure without having to open the basic machine or to employ a service technician. In particular, the postage calculation format should be easily convertible or expandable given new postage calculating structures as may occur later.

In addition, it is an object to provide a more flexible method for data transmission for processing the postage calculation so that devices such as, for example, postage scales or a postage meter machine in combination with a scale, can be expanded to future services of various private mail carriers, so that the postage value can be calculated according to currently valid fee schedules.

A common cause of the above-recited disadvantages is that the problem of possible, later changes in postage fee schedules was previously solved by the replacement or reloading of a new fee table. The actual fee calculation still ensues with the existing program of the postage computer integrated into the corresponding basic device (postage meter machine or postage scale) by evaluating the reloaded or externally plugged postage table. Since the program to be interpreted as well as the computer cannot be modified from the outside, only a predetermined class of postage fee schedule changes can be reloaded. The replacement of the fixed interpretation program can also become necessary if the structure changes fundamentally in an unpredicted way, so that the employment of a technician at all installed systems becomes necessary. Extensive modifications may be required since the reloadability of the postage tables is limited for all time due to the hardware equipment of the existing computer, especially with respect to the memory space for the acceptance of the fee table or the addressability, as well as the calculating speed. It is easily conceivable that future postage tables—due to their complexity—could no longer be reasonably processed by the old computer for these reasons. This is even more likely if the fee schedules of an increasing number of carriers entering the market are to be taken into consideration in the postage calculation. An over-dimensioning of the hardware of a postage meter machine or of a postage scale to an adequately to avoid future limitations, however, would represent a compromise that already costs money at the time of the device production and may only be required by a few users, or may possibly never be required.

The basic concept of the invention is to fashion not only the postage tables to be replaceable by the customer, but also to have the postage calculator replaced by the customer at the same time.

The fashioning of the postage fee and calculating module inventively ensues as a replaceable means for postage calculation, referred to below as an interchangeable postage calculating module, that can be plugged onto a standard interface, or can be introduced into the inside of a basic device at a location accessible by the customer. This interchangeable postage calculating module contains the basic parts of a complete postage computer, particularly a central processing unit (CPU) and a memory for postage information as well as a housing.

It is expedient to accommodate the postage calculating module in a housing, which itself can be plugged onto an exterior pin set of a basic device such as a postage meter machine or a postal scale.

The interface is implemented as a standardized serial interface. The postage calculating module is provided with at least one operating voltage via an interface plug.

In case of a change in the postage calculating structure, such a postage calculating module can be replaced by the user as a whole.

The postage calculating module supplies data of at least one carrier to change the display in the basic device on the basis of inputs with respect to service demands that have been made for a carrier and for processing the supplied data in the basic device.

Via the interface, the postage calculating module receives information about weight and additional particulars of the user with respect to shipping, generated particularly by pressed keys, from the computer of the postage meter machine and/or of the scale. From this information, the replaceable postage calculator calculates the postage value and supply this value in combination with other data to the requesting computer in the basic device via an interface.

The interchangeable postage calculating module can be implemented as a single-chip computer or as a processing unit CPU with separate memory elements.

The program for determining postage can be supported using postage tables of the conventional type but this does not impose restriction since the program located in the postage calculating module can be replaced by the customer at the same time as the tables. As a result, postage structure elements that are difficult to accommodate in postage tables can be calculated in a simple way on the basis of a corresponding program execution, thereby providing advantages with respect to the memory requirements as well as the processing speed. This is especially true when a new carrier offers a service for which fees are determined according to a divergent or different fashion from previously. This is also advantageous given complex changes in postage calculation of the local mail carrier. Advantages are also achieved in the production of different national versions of the same machine, since the operating program in the basic machine need not be altered when a different country-specific calculating structure is desired.

The protocol is preferably such that the use of the interchangeable postage calculator of the invention is possible as an auxiliary for a scale as well as an auxiliary for a postage meter machine. As a result, an entire device family can be optionally equipped with the postage calculating function.

The postage calculating module can be devised to send some of the received values back to a requesting device. These values can be modified by the postage calculating module on a case-by-case basis in order to inform the requesting device, and thus the user, that the originally selected form of shipment is inadmissible or inexpedient because of the fee schedule structure. It is possible to simultaneously inform the user of an expedient, alternate form of shipping.

Some other commands in the protocol, for example for interrogating the version (model) number of the interchangeable postage calculating module or for transmitting information about the requesting system to the interchangeable postage calculating module, so that different program routines can be executed if the interchangeable postage calculating module is to be operated in different systems.

In an embodiment of the invention, the housing of the postage calculating module is equipped with two interfaces in order to be able to insert the computer into the serial cable connection between the postage meter machine and a scale that determines the weight. Various embodiments are then possible for the signal path. The signal path can proceed via the second interface connected to the scale that the postage calculating module directly utilizes the scale information for determining the postage. Only the determined postage value is transmitted with the first interface with which the postage calculating module is connected to the postage meter machine. It is also possible for the scale information to be first forwarded via the interfaces of the postage calculating module to the postage meter machine and to proceed from the latter to the postage calculating module at a different time, as a block, with the particulars about the user inputs related to the postage calculation. Third, it is possible for the postage calculator to interrupt the otherwise through-connection between the postage meter machine and the scale, by means of additional hardware, when it recognizes from the data stream that the current information block is intended for it. Alternatively, the module can interrupt the connection when an information is to be sent to the postage meter machine by the postage calculator itself.

The postage calculator can convert all of the information stream from the scale, read on one interface and only after a complete conversion, forward it to the postage meter machine. This provides the advantage of being able to subsequently connect scales with respectively different protocols to existing systems without having to intervene in the postage meter machine, for instance to replace to the scale communication program.

It is expedient for the postage meter machine to automatically recognize the presence of the interchangeable postage calculator in order to correspondingly offer the customer the calculating function, or to interrogate the desired postage value from the customer.

The interchangeable postage calculating module be programmed, or data can be loaded therein via the serial interface.

DESCRIPTION OF THE PREFERRED EMBODIMENTS

Figure 1:
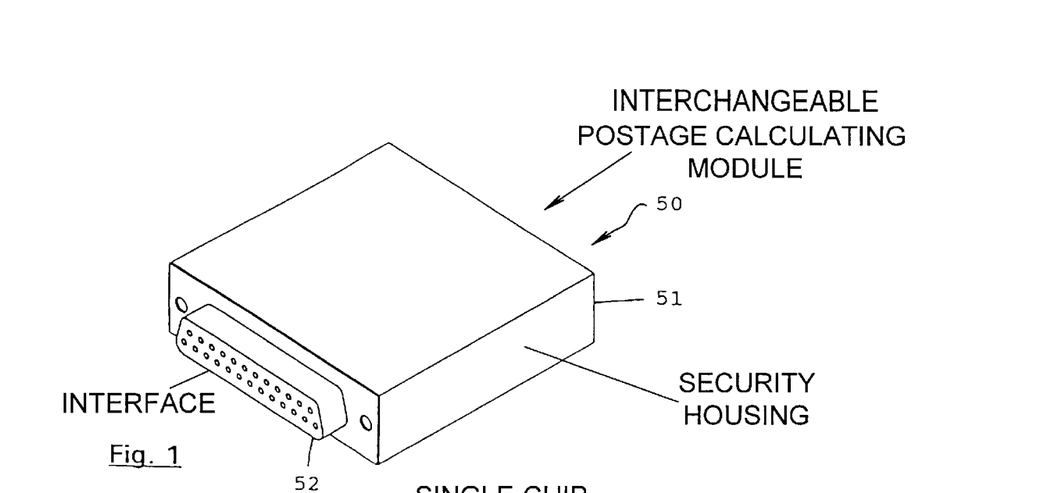
FIG. 1 is a perspective view of a pluggable postage calculating module constructed and operating in accordance with the principles of the present invention.

FIG. 1 shows a view of the inventive pluggable postage fee and calculating module 50 with a security housing 51 having a serial interface 52, for example a V24 interface.

Figure 2:
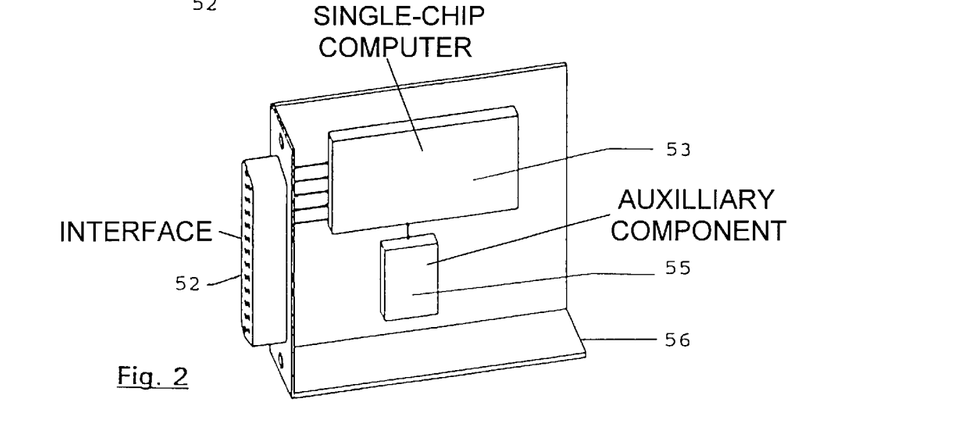
FIG. 2 is an inside view of a first embodiment of a pluggable postage calculating module constructed and operating in accordance with the principles of the present invention.

The inside view shown in FIG. 2 shows an economic structure with a single-chip computer 53 on a motherboard 56. In addition, the single-chip computer 53 can be connected to an auxiliary component 55 for clock generation.

In order to prevent unauthorized copying, the postage computer of the interchangeable postage calculating module can also be fashioned as an OTP (one time programmable) processor. Such an OTP processor has an internal volatile memory iROM or iEPROM, the latter being correspondingly programmed for the customer during manufacturing or thereafter. All important program parts are stored in the internal program memory iROM. After programming the OTP, the program—including the interface program—can no longer be read out.

For example, an 8051 processor with a 16 kByte on-chip EPROM al internal program memory can be utilized as such an OTP.

Another OTP type has an additional, writeable, internal non-volatile memory $E^2PROM$ in which carrier-specific data (for example, fee schedule table data) can be loaded via the interface.

Figure 3:
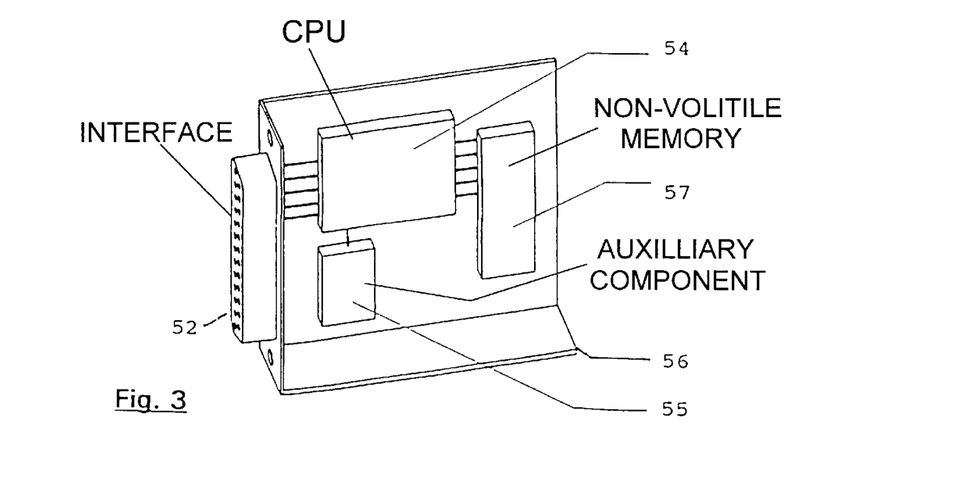
FIG. 3 is an inside view of a second embodiment of a pluggable postage calculating module constructed and operating in accordance with the principles of the present invention.

The inside view shown in FIG. 3 shows a version somewhat more complicated in manufacture having a processing unit (CPU) 54, a non-volatile memory 57 and an auxiliary component 55. The latter can include a clock generator and possibly, other assemblies that are required for the operation of the serial interface (V24 interface).

A PROM, EPROM, E $^2$PROM, FLASH memory or battery-supported CMOS-RAM can be employed as the non-volatile memory 57.

The internal processing unit CPU of the interchangeable postage calculating module is programmed by a calculating program stored in the non-volatile memory to supply data for at least one carrier from the interchangeable postage calculating module for display modification in the basic device on the basis of user inputs with respect to service demands on the carrier and for processing the supplied data in the basic device;

receive weight data and shipping data for a piece of mail;

calculate postage value on the basis of the postage fee schedule table data and calculating structure of the desired carrier in the interchangeable postage calculating module; and supply data including the postage value for at least one carrier from the interchangeable postage calculating module for carrier-related processing of the supplied data in the basic device.

Figure 4:
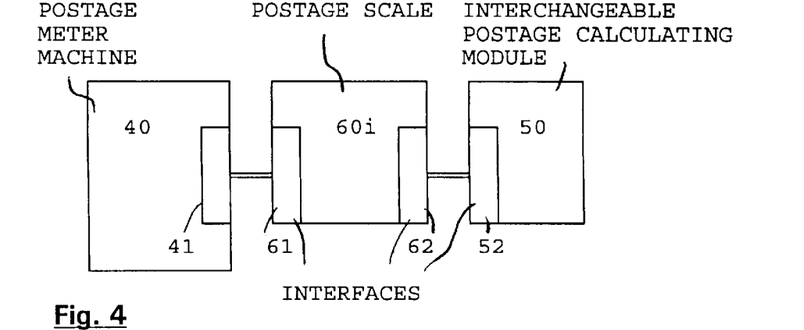
FIG. 4 is a block diagram of a pluggable postage calculating module for a postage scale constructed and operating in accordance with the principles of the present invention.

FIG. 4 shows an interface circuit with a pluggable postage fee and calculating module for a postage scale that has one serial interface 61 connected to one serial interface 41 of the postal meter machine 40. A known, postage scale 60i with processing capability is commonly provided for calculating postage for a single public mail carrier (postal service). An expansion of such a scale to a set of carriers is disclosed in published European Application 724 141, corresponding to U.S. Pat. No. 5,710,706, so that the desired carrier can be selected from the aforementioned set. A carrier identification number (CIN) is allocated to each carrier as an identifier. The calculated postage and the CIN are communicated from the postal scale 60i to the postal meter machine. The postage scale 60i contains an electrically programmable non-volatile memory for the fee schedule table data. The postage meter machine 40 and the postal scale 60i are initialized for the same location and the same set of carriers. Check data are communicated from the postal scale 60i to the postage meter machine 40 for checking in the postage meter machine 40 whether the fee schedule table data are still current. If not, an automatic updating can be implemented.

An inventively improved postal scale 60i is equipped with two serial interfaces 61 and 62 and with an internal processor that is programmed to communicate data including the weight data to the interchangeable postage calculating module 50 for postage calculation. In particular, such data can be the shipping class such as, for example, letter, package, printed matter, merchandise, books and others, and/or the shipping form such as, for example, express, registered, return receipt, air mail and others, and/or data about the destination zone, domestic, foreign, postal zip code, zip to zone, and (possibly) data identifying the thickness of the mailing, the format of the mailing as well as selective imprints such as, for example, registered and other data. The postal scale 60i has a keyboard by which such data can be entered, as well as a corresponding display. Under certain circumstances, the interchangeable postage calculating module 50 plugged onto the serial interface 62 of the postal scale 60i via its serial interface 50 enables a selection between further shipping data that are not provided by the single, public mail carrier (postal service). The processor of the postal scale 60i is programmed to interrogate the interchangeable postage calculating module 50 for further shipping data—as shall be explained on the basis of FIG. 10—in order to display such further shipping data after actuation of a suitable actuation means (key), for example in order to enable a selection via the keyboard of the postage scale. The calculated potage value is then communicated via the postage scale 60i to the postage meter machine 40. Such a version with a postage scale 60i preferably serves for expanding the postage calculation to at least one new mail carrier, or for adaptation to a new calculating structure with the interchangeable postage calculating module 50.

Figure 5:
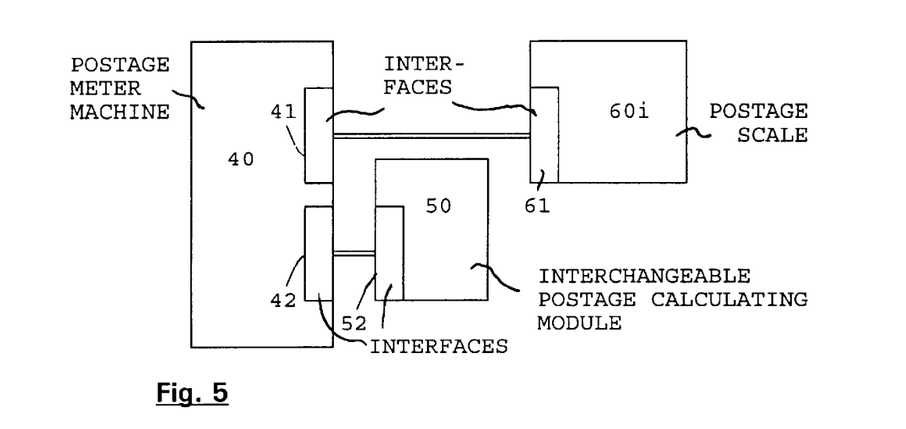
FIG. 5 is a block diagram of a pluggable postage calculating module constructed and operating in accordance with the principles of the present invention for a postage meter machine in a first interface interconnection version.

According to an interface circuit shown in FIG. 5, a pluggable postage fee and calculating module 50 can also be plugged onto a free interface 42 of a postage meter machine 40. In this first version, a scale 60 is plugged onto a second interface of the postage meter machine 40 in order to communicate weight data. This produces the advantage of allowing a less costly scale 60 to be used, compared to a postage scale 60i, since this scale 60 need not be internally fashioned for postage calculation and need not even be fashioned for input and display of (all) shipping data.

In a version of the embodiment (not shown) with a mechanical scale and—by contrast to the circuit of FIG. 5—without interface connection from the scale to the postage meter machine 40, it is also alternatively provided that weight and shipping data are communicated to the interchangeable postage calculating module 50 from the same device, namely the postage meter machine 40. The weight values read from the mechanical scale must then be manually input into the postage meter machine 40 via the postage meter machine keyboard.

Figure 6:
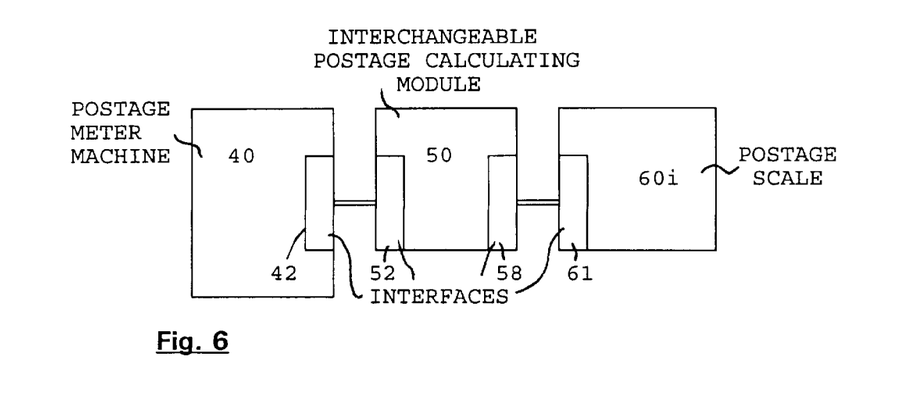
FIG. 6 is a block diagram of a pluggable postage calculating module constructed and operating in accordance with the principles of the present invention for a postage meter machine, in a second interface interconnection version.

FIG. 6 shows a postage calculating module—pluggably fashioned—for a postage meter machine 40 in a second embodiment, for use if the postage meter machine 40 does not have enough free interfaces. This second embodiment of the interface circuitry for a postage meter machine 40 and for at least one postage calculating module 50, provided with doubled interfaces 52 and 58, is advantageous for interface expansion when, for example, the postage meter machine 40 is equipped with only a single serial interface 42. The interchangeable postage calculating module 50 has its serial interface 52 plugged onto the serial interface 42 of the postage meter machine 40. The interchangeable postal calculating module 50 inventively has a second interface 58, preferably for the postal scale 60i, and is programmed with a corresponding adapter function with protocol conversion.

The display of the shipping data possibilities is realized either via the display unit of the scale or of the postage meter machine.

If the postal scale 60i forms the basic device (FIG. 4), the shipping data possibilities are displayed via the display unit of the postal scale 60i. For adaptation to new postage calculating structures or other carriers, a modified operating manual belonging to the scale type and a new, appertaining scale keyboard (keypad) foil are supplied by the manufacturer. Instead of the scale keyboard foil, individual stick-on labels for specific function keys of the scale can be provided dependent on the type of scale. The necessity of providing a modified scale keyboard foil or stick-ons can be eliminated when the keys of the scale keyboard are neutrally identified, with the identifiers being listed and explained in the operating manual. The adaptation of the display can ensue in various ways dependent on the type of display.

Figure 11:
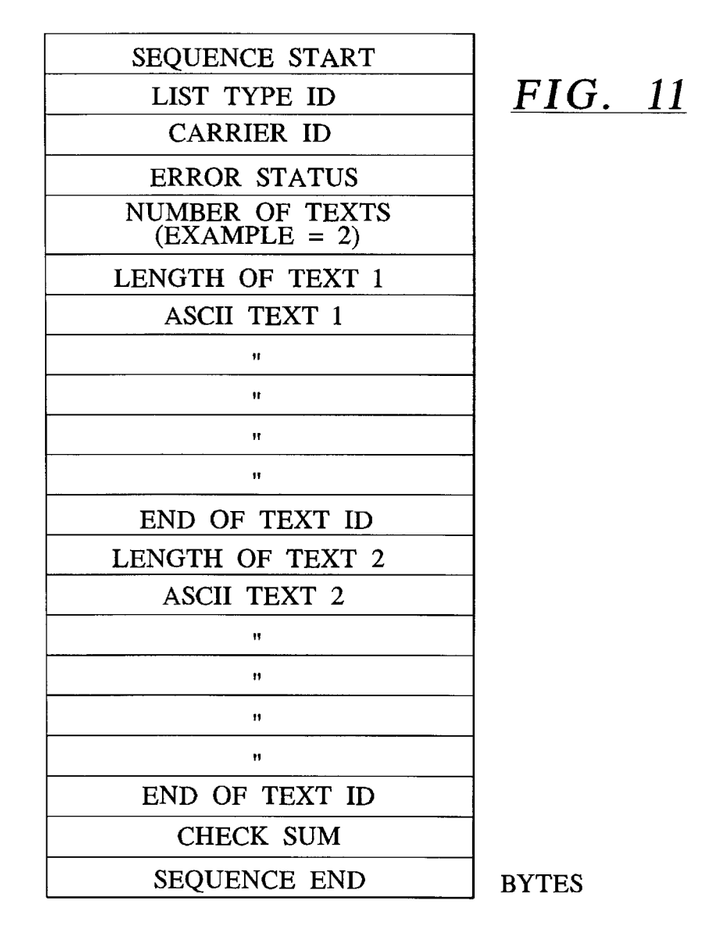
FIG. 11 illustrates an additional dataset for the information flow from the interchangeable postage calculating module constructed and operating in accordance with the principles of the present invention to the postage meter machine.

An adaptation of the user interface at the output side is fundamentally realized by (a) displays of listed or of individual command code in combination with explanatory clear texts in the appertaining operating manual, or (b) displays of texts that are supplied from the interchangeable postage calculating module 50 (dataset in FIG. 11).

Version (a) enables a communication with the user even given simple display units such as, for example, a ten-place, seven-segment display. The characters displayed via the ten-place, seven-segment display are identified by the user as command code on the basis of the aforementioned, modified operating manual and can be changed or acknowledged with a key actuation.

If, however, the postage meter machine 40 is the basic device, the display of the shipping data possibilities can likewise be realized in the aforementioned way via the display unit of the postage meter machine 40.

An improvement of the user interface is achieved by employing an alphanumeric display unit suitable for displaying text or with a graphics-compatible display. Departing from an existing menu structure, a specific menu supplied by the interchangeable postage calculating module 50 can be presented, with datasets being exchanged via the communication connection between the interchangeable postage calculating module and postage meter machine, as explained in greater detail with reference to FIGS. 10 and 11. The processor of the postage meter machine 40 is programmed to display such further shipping data in order to enable a selection via the keyboard of the postage meter machine 40.

The selection of shipping data is communicated to the interchangeable postage calculating module 50. The calculated postage value is then communicated from the interchangeable postage calculating module to the postage meter machine 40. The scale 60 then supplies only the weight data measured for the particular piece of mail.

Figure 15:
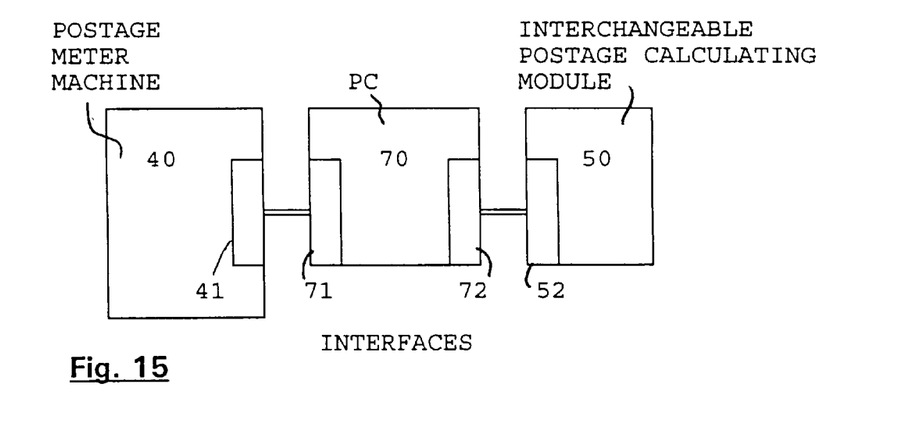
FIGS. 15 through 17 respectively show the embodiments of FIGS. 4 through 6 with the postal scale replaced by a personal computer.
Figure 16:
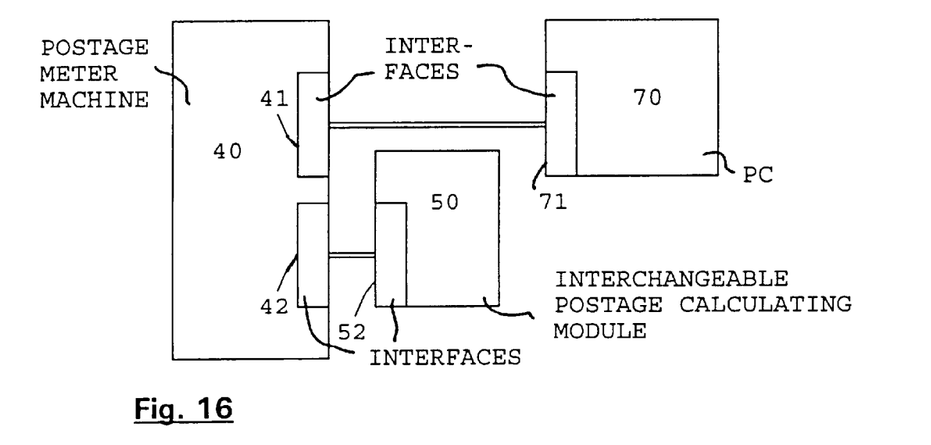
Figure 17:
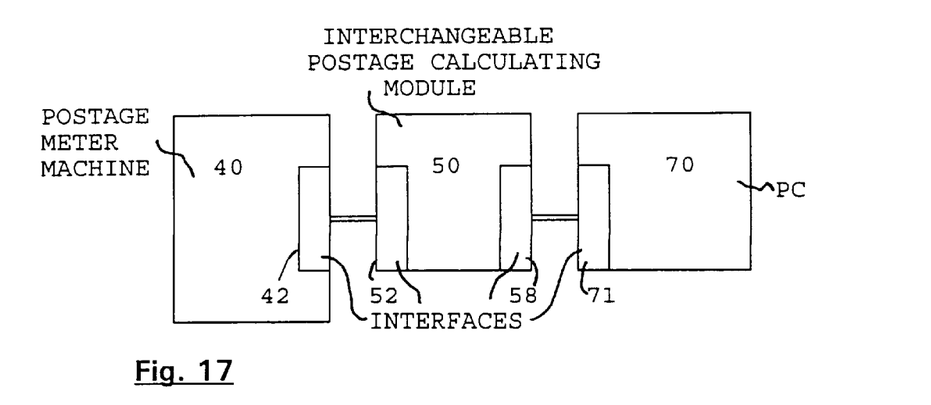

If the postal scale 60i or 60 in FIGS. 4 through 6 is removed, further alternative embodiments are available. In one such version (not shown in FIGS. 4 through 6) weight and shipping data are communicated to the interchangeable postage calculating module 50 from the same device. Thus, for example, weight data can be manually entered or can be calculated under certain circumstances in a device such as personal computer 70 (see FIGS. 15–17) or the postage meter machine 40, thereby making the postage scale 60i or 60 superfluous. Some other peripheral device can also be provided for the entry of the weight data.

Advantageously, an automatically operating postage meter machine can be connected to a personal computer via which all inputs are undertaken. For entry of the weight data by the personal computer 70, the weight data are calculated on the basis of the number of inserts, the average insert weight, the type of packaging and the weight of the packaging material. A suitable system—but without the inventive interchangeable postage calculating module—is disclosed in greater detail in German OS 196 17 557, corresponding to co-pending U.S. application Ser. No. 08/850,051, filed May 2, 1997.

In another version, the postage meter machine 40 is equipped with a comfortable user interface for all inputs and displays. A suitable system—but without the inventive interchangeable postage calculating module—is disclosed in greater detail in German OS 196 17 476, corresponding to co-pending U.S. application Ser. No. 08/850,413, filed May 2, 1997. If the inventive interchangeable postage calculating module is employed in such a system, an interface circuit as was fundamentally shown in FIG. 5 will be used, but with a remote personal computer 70 connected to the serial interface instead of a scale.

Figure 12:
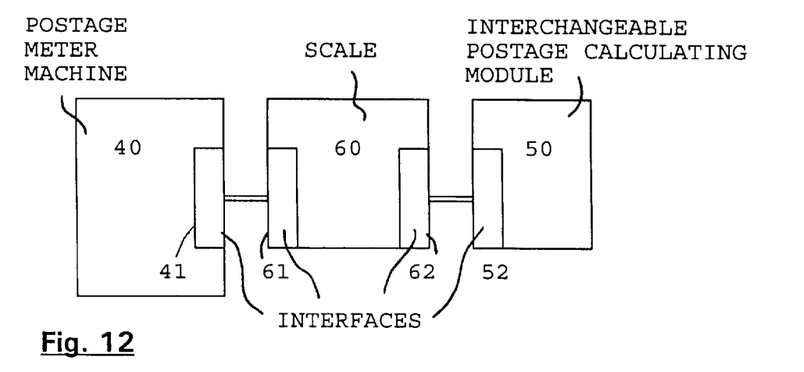
FIGS. 12 through 14 respectively show the embodiments of FIGS. 4 through 6, with the postal scale replaced by a scale without calculating capability.
Figure 13:
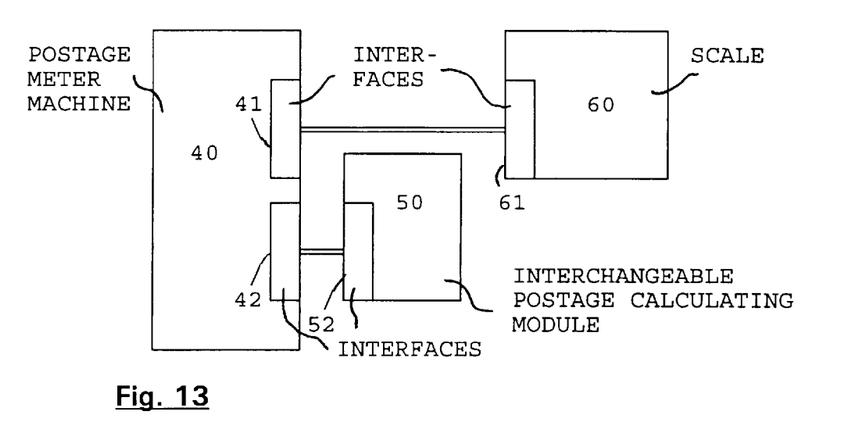
Figure 14:
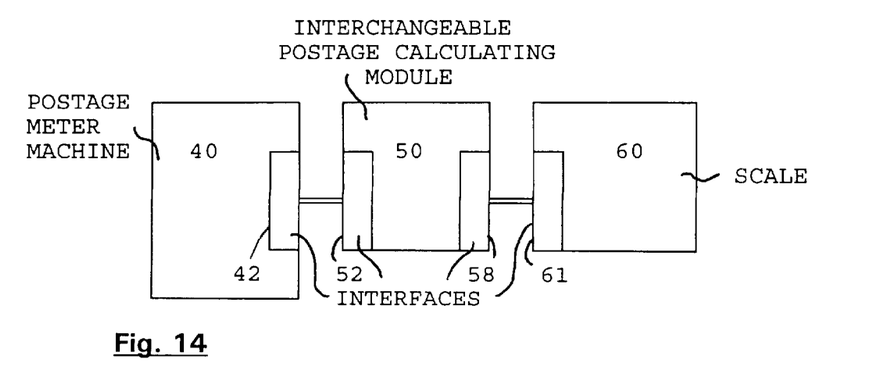

The above-described embodiment wherein a scale 60, without postage calculating ability, is employed instead of the postal scale 60i are shown in FIGS. 12 through 14. The scale 60 employs the same interface 61 (and if necessary, another interface 62) as the postal scale 60i. Embodiments wherein the postal scale 60i is replaced by a personal computer (PC) 70 are respectively shown in FIGS. 15 through 17. The personal computer 70 has an interface 71 (and, where necessary, an interface 72).

Figure 7A:
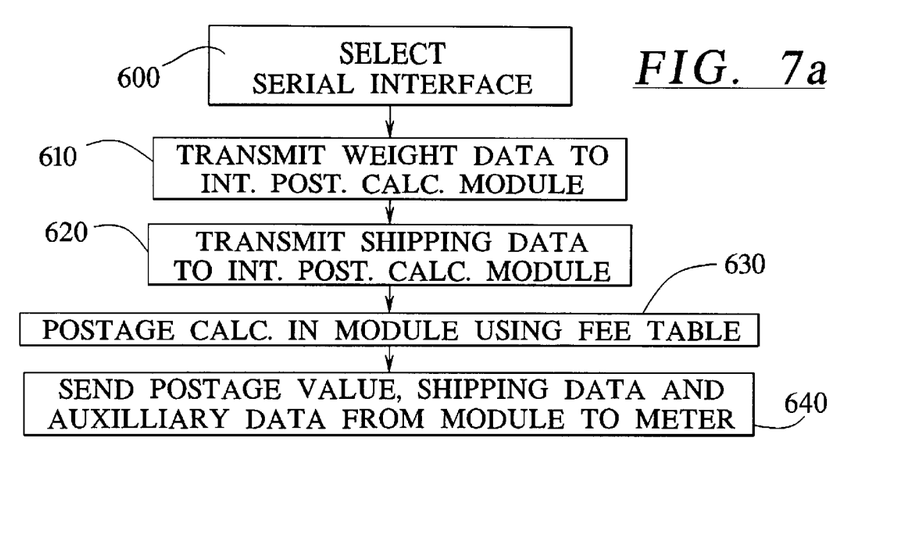
FIG. 7a is a flowchart for the data exchange of a pluggable postage calculating module constructed and operating in accordance with the principles of the present invention, for determining the postage value for a postage scale or a postage meter machine.

FIG. 7a shows a flowchart for the data exchange of a pluggable postage fee and calculating module with further devices, preferably for the determination of the postage value for a postage scale or a postage meter machine. Various devices in interactive relationship with one another such as the postage meter machine 40, the scale 60 or the personal computer 70 can implement the following steps:

Step 600, selecting the serial interface to the interchangeable postage calculating module 50;

Step 610, communicating data including weight data to the interchangeable postage calculating module 50 that contains a postage fee and calculating module and that is connected to any one of the aforementioned devices, or between two of the aforementioned devices;

Step 620, communicating the shipping data to the interchangeable postage calculating module 50; the shipping data contain the shipping class and the shipping form and can include further data;

Step 630, postage calculation in the interchangeable postage calculating module to according to current fee schedule; and Step 640, sending postage value, shipping data and auxiliary data to the postage meter machine 40.

The connection of the various devices 40, 60 and/or 70 to the interchangeable postage calculating module 50 fundamentally ensues according to one of the versions shown in FIGS. 4, 5 or 6. In one version of the embodiment, weight and shipping data are communicated to the interchangeable postage calculating module 50 from different devices 40, 60 and/or 70. Corresponding sub-steps of the method for the communication of the shipping data from different devices to the interchangeable postage calculating module 50 are then provided in the second step 620 of the above-recited method steps.

The flowchart explained with reference to FIG. 7a is suitable for the versions shown in FIGS. 4 and 5, and this flowchart for an interchangeable postage calculating module is also suitable for a first version of the second embodiment (shown in FIG. 6) for a postage meter machine with pluggable postage fee and calculating module at a serial interface. It is thus possible that the scale 60 only communicates the weight value and the postage calculation ensues in the interchangeable postage calculating module. The other selected shipping data and the identifier CIN of the selected mail carrier are communicated to the interchangeable postage calculating module by the postage meter machine.

Figure 7B:
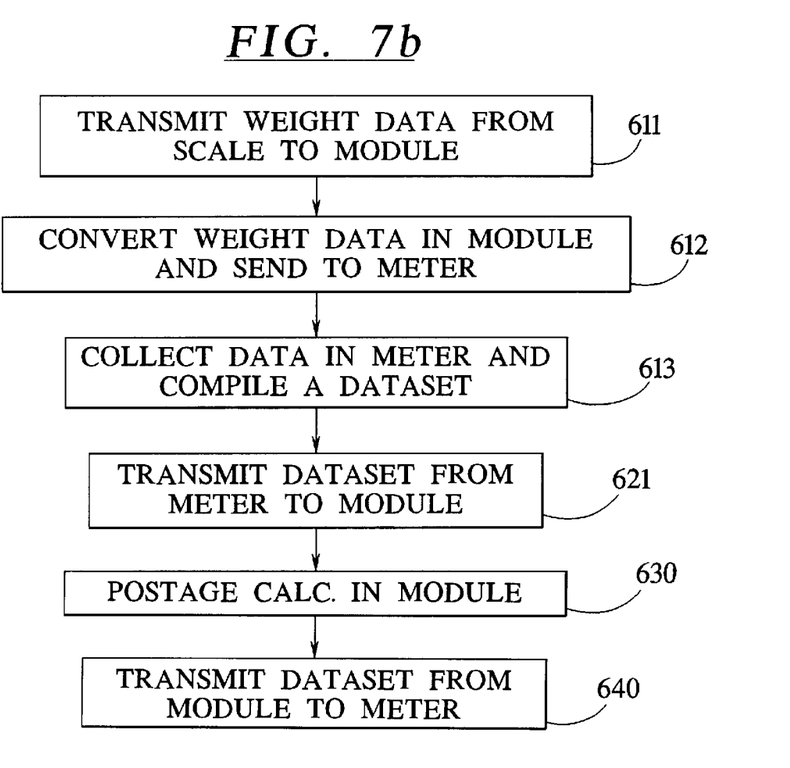
FIG. 7b is a flowchart for the data exchange of a pluggable postage calculating module constructed and operating in accordance with the principles of the present invention according to a further version.

FIG. 7b shows a further version of a flowchart for the data exchange of a pluggable postage fee and calculating module. This version specifically applies to the interface circuitry shown in FIG. 6. A step 600 for selecting the interface is again provided but not shown.

In the sub-step 611, the scale 60i supplies the current weight to the interchangeable postage calculating module 50, analogous to the above-explained step 610 for the communication of the weight data to the interchangeable postage calculating module 50. After this first sub-step 611 with a signal flow from the scale 60 to the interchangeable postage calculating module 50, the weight information is converted as needed and is then communicated to the postage meter machine in the sub-step 612. After this communication of the weight data to the postage meter machine, collection of data in the postage meter machine ensues in the sub-step 613. The postage meter machine first intermediately stores the weight data until the user has entered the shipping class, form, and other data, for example the CIN. The postage meter machine compiles a dataset (shown in FIG. 8) incorporating the shipping data and further data. The step 620 is related to the sub-step 621 so that the aforementioned dataset is transmitted from the postage meter machine 40 to the interchangeable postage calculating module 50. In the step 630, the postage calculation by the postage fee and calculating module situated in the interchangeable postage calculating module again ensues. Subsequently, step 640 is executed, whereby the interchangeable postage calculating module 50 communicates a dataset to the postage meter machine 40, which is explained in greater detail with reference to FIG. 9.

Figure 8:
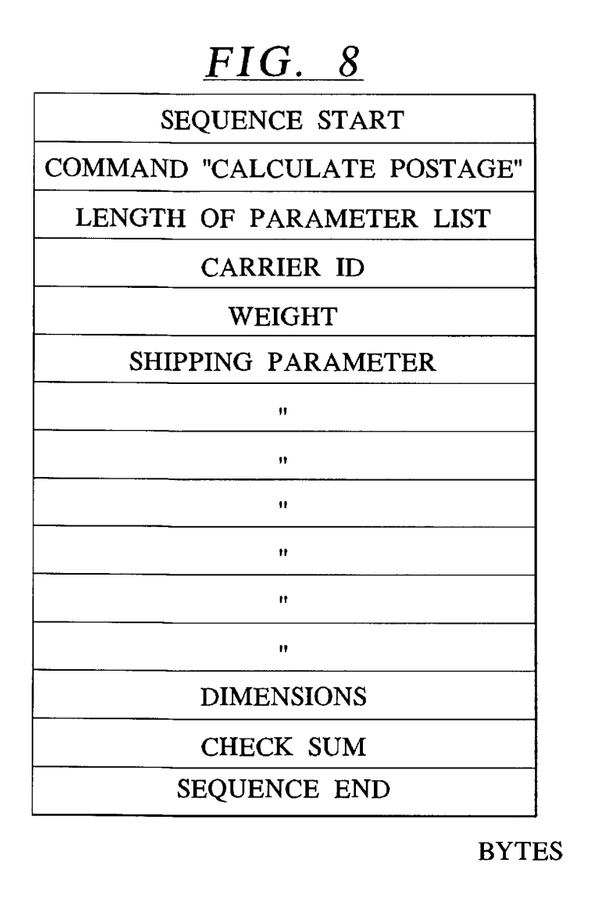
FIG. 8 illustrates a dataset for the information flow from the postage meter machine to the interchangeable postage calculating module constructed and operating in accordance with the principles of the present invention.

FIG. 8 shows a dataset for the information flow from the postage meter machine to the interchangeable postage calculator such as, for example, communicated in step 621. Inventively, an identifier CIN for the selected mail carrier is communicated in the dataset. The dataset includes at least the weight of the piece of mail and selected shipping parameters. The number of shipping parameters is variable. In order to communicate this number, information about the length of the parameters list of the dataset is previously communicated. As warranted, further data such as, for example, dimensions of the piece of mail are communicated. Further dataset components can be included in the transmission. The dataset is opened with a start sequence and closed with an end sequence. For the purpose of data protection, the dataset also contains a checksum over critical data of the dataset.

Figure 9:
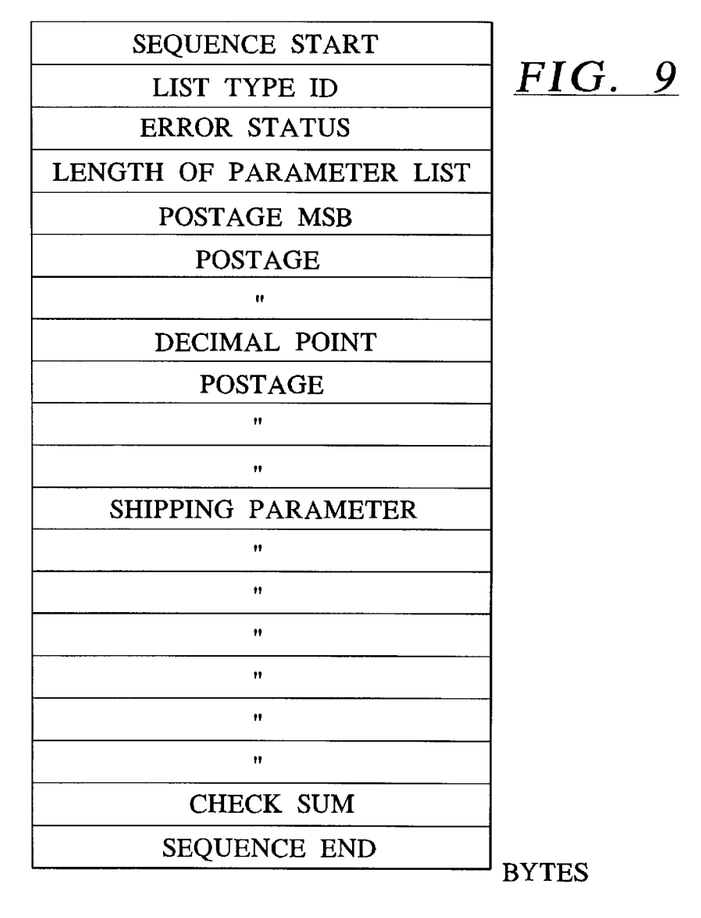
FIG. 9 illustrates a dataset for the information flow from an external postage calculating module constructed and operating in accordance with the principles of the present invention to the postage meter machine.
Figure 10:
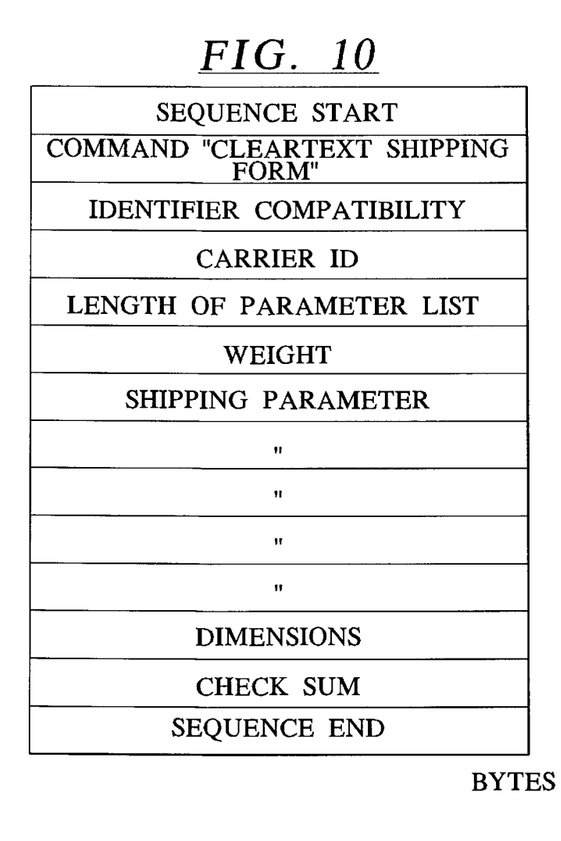
FIG. 10 illustrates an additional dataset for the information flow from the postage meter machine to an interchangeable postage calculating module constructed and operating in accordance with the principles of the present invention.

FIG. 9 shows a dataset for the information flow from the interchangeable postage calculator to the postage meter machine. Inventively, an identifier CIN for the selected mail carrier and an identifier for the list type or type of postage fee and calculating module is communicated in the dataset. The dataset includes at least the calculated postage value starting with the most significant bit (MSB) and possibly including the place for the decimal point. The dataset is opened with a start sequence and closed with an end sequence. For the purpose of data protection, the dataset also contains a checksum over critical data of the dataset as well as information about the length of the parameter list of the dataset. As an additional dataset constituent, the dataset contains an information about the error status. Here, for example, "0" can mean no error but "1" can mean an error due to a modified shipping form. The error "2" is displayed when a calculation is not possible. An unknown carrier selected due to an incorrectly communicated CIN is indicated by error "10", etc. FIG. 10 shows an additional dataset for the information flow from the postage meter machine to the interchangeable postage calculator that executed for the preparation of a selection of the CIN, of shipping data and other data. Inventively, a command COMMAND "CLEARTEXT SHIPPING FORM" and a parameter IDENTIFIER COMPATIBILITY as well as an identifier CIN for the carrier "CARRIER" are communicated. The IDENTIFIER COMPATIBILITY makes it possible to communicate a dataset (characters or text) to the requesting basic device (postage scale, postage meter machine) adapted to its display means. Detailed explanations can be called in an auxiliary mode.

Inventively, an automatic adaptation to a different user interface hardware for the greatest variety of basic devices is provided.

FIG. 11 shows an additional dataset for the information flow from the interchangeable postage calculator to the postage meter machine. Inventively, texts are communicated in order to enable a setting or display of shipping parameters and other carrier-specific data. In addition to the dataset constituents that have already been described and the identifier of the list type and the identifier of the carrier, the following information are communicated:

number of texts,
length of the text with the number 1
ASCII characters for the text for number 1
end of text identifier,
length of the text with the number 2
ASCII characters for the text for number 2
end of text identifier, etc.

Via the display unit of the basic device, for example the postage meter machine, a display can ensue that, correspondingly correctly ordered in the menu, also enables a selection between additional setting data or, respectively, supplementary parameters. A prerequisite for this is an adaptable tree structure of the menu branchings of a flexible user interface as disclosed, for example, in published European Application 780,806, corresponding U.S. Pat. No. 5,852,813.

The communication with such datasets shown in principle in FIGS. 10 and 11 can ensue repeatedly in succession and is always advantageous when the basic device has a comfortable user interface available with a multi-line display suitable for text presentation or a graphics-compatible display.

In another version, modified carrier-specific parts of the print format can be non-volatilely stored in the memory of the interchangeable postage calculator module and be loaded into the postage meter machine on demand. An encoded checksum over the data of the carrier-specific parts of the print format is provided for security against manipulation. The carrier for shipping a particular piece of mail can then be recognized, for example in a mail distribution center, from the franking imprint or the print format. Of course, a non-mechanical printing process for arbitrarily programmable imprints is especially suitable for such an embodiment.

In another version of the embodiment, a postage meter machine that has a serial interface and a suitable interface communication program can be subsequently rigged for automatic postage calculation for one or more carriers. A basic machine that has the country-specific carrier, particularly the public mail carrier such as, for example, the Deutsche Post AG, loaded in the non-volatile memories as a standard, can still be retrofitted. Given employment of the inventively pluggable and replaceable interchangeable postage calculator module, additional carriers can be additionally selected in order to inventively have the piece of mail optionally carried by a different carrier when this is more beneficial.

The lack of any restrictions for the postage calculation in the case of a retrofit by the customer is an important advantage. The postage calculation thus can also be implemented even in the context of completely new or different shipping options or formats that a carrier may define in the future.

With the increasing liberalization of mail delivery, mail processing systems are of interest to customers with which it is possible for a customer to make a shipping selection for that customer from the offerings of various competing carriers. This assumes that the data center or the service facility of the postage meter machine manufacturer or of the carrier can make information available to the customer for this selection. For accounting, the postage meter machine is equipped with the same set of desired carriers as the interchangeable postage calculating module.

During initialization of the basic device such as the postage meter machine, a pre-selection of a group of carriers ensues, this group being loaded in the interchangeable postage calculating module. The desired carrier can be subsequently selected from this group. Every carrier is assigned an unambiguous identifier CIN. Alternatively, an inventive routine in the postage meter machine can automatically identify coincidence with further, current, carrier-related data that are stored in the basic machine, for example the postage meter machine, allocated to the CIN. For example, such additional data can be used to generate a carrier-specific print format and to enable a country-specific accounting in the postage meter machine. Every non-coincidence is displayed as an error message.

In a further embodiment of the invention, an automatic updating routine for stored fee schedule table data is implemented in the postage meter machine so that the postage meter machine can enter into a communication connection with a data center as needed. Potentially, fee schedule table data can be newly loaded and then communicated to the postage fee module in the interchangeable postage calculating module 50. The interchangeable postage calculating module 50 is only replaced in this embodiment when at least one carrier from the set of carriers has a postage value calculated in the future according to a different underlying calculation structure.

A location-specific initialization of the postage meter machine ensues automatically or manually after every turn-on thereof. This takes place after the turn-on in a sub-step of the initialization routine by entering the postal zip code into the postage meter machine.

The capability of determining a postage value for a specific carrier is fundamentally determined by the purpose of a postage meter machine of franking shipping items or pieces of mail for this one, selected carrier. If the corresponding fee schedule or the desired service is not available in the postage calculation module 50, an automatic determination of the postage is not possible for some of the carriers. If the corresponding fee schedule or the desired service is not available in the postage calculator module 50, the postage calculator module 50 answers with an error message.

If, conversely, the desired service available from (offered by) the postage calculator module 50 deviates from the intended use of the basic device, or if the postage meter machine is not suitable for certain types of franking or printing on a piece of mail, this can likewise be determined and displayed or signaled, particularly as a reaction to a corresponding input by an input means of the user interface hardware (keyboard).

Although modifications and changes may be suggested by those skilled in the art, it is the intention of the inventor to embody within the patent warranted hereon all changes and modifications as reasonably and properly come within the scope of his contribution to the art.

We claim as our invention:

1. An interchangeable postage calculating module usable with at least one basic device, said interchangeable postage calculating module comprising:

a housing;

an internal processing unit contained in said housing;

a non-volatile memory in said housing in communication with said internal processing unit;

connection means adapted for releasable mechanical connection of said housing to said at least one basic device and for producing an electrical path for exchanging data between said internal processing unit and said at least one basic device; and said non-volatile memory containing a calculating program and postage fee schedule data in tabular form, and said internal processing unit and said non-volatile memory comprising, in combination, means for supplying data related to at least one shipping carrier to said basic device dependent on user inputs with regard to service demands for a carrier, means for receiving weight data and shipping data from said basic device for a piece of mail, means for calculating a postage fee for shipping said piece of mail using said postage fee schedule data and said data for at least one carrier, and means for supplying data, including said postage fee, for said at least one carrier to said basic device via said connection means.

2. An interchangeable postage calculating module as claimed in claim 1 wherein said communication means comprises at least one serial interface adapted for connection to a plurality of different basic devices.

3. An interchangeable postage calculating module as claimed in claim 1 for use with a postage scale as said at least one basic device, said postage scale having a serial interface, and wherein said communication means comprises a serial interface pluggable onto said serial interface of said postage scale.

4. An interchangeable postage calculating module as claimed in claim 1 for use with a postage meter machine as said at least one basic device, said postage meter machine having a serial interface, and wherein said communication means comprises a serial interface pluggable onto said serial interface of said postage meter machine.

5. An interchangeable postage calculating module as claimed in claim 1 for use with a first basic device and a second basic device, and wherein said communication means comprises a first serial interface adapted for connection to said first basic device and a second serial interface adapted for connection to said second basic device.

6. An interchangeable postage calculating module as claimed in claim 5 wherein said internal processing unit comprises means for adapting to said first and second basic devices with protocol conversion.

7. An interchangeable postage calculating module as claimed in claim 1 wherein said communication means comprises a serial interface, wherein said internal processing unit comprises a single-chip computer, and further comprising a motherboard in said housing on which said single-chip computer and said serial interface are mounted.

8. An interchangeable postage calculating module as claimed in claim 7 wherein said internal processing unit comprises a one-time programmable processor containing an internal volatile main memory and an internal non-volatile memory.

9. An interchangeable postage calculating module as claimed in claim 8 wherein said internal volatile main memory comprises an iRAM.

10. An interchangeable postage calculating module as claimed in claim 8 wherein said internal non-volatile memory comprises a memory from the group consisting of an iROM, and iEPROM, and an $E^2PROM$.

11. An interchangeable postage calculating module as claimed in claim 1 further comprising an auxiliary component including a clock generator contained in said housing and connected to said internal processing unit.

12. An interchangeable postage calculating module as claimed in claim 1 wherein said communication means comprises a serial interface and a plurality of operating components for said serial interface, said serial interface and said plurality of operating components being contained in said housing.

13. A method for data transmission between an interchangeable postage calculating module and a basic device, comprising the steps of:

releasably connecting an interchangeable postage calculating module to an exterior of a basic device;

selecting a serial interface in said basic device to said interchangeable postage calculating module;

communicating data including weight data of a piece of mail to be shipped from the basic device to the interchangeable postage calculating module;

communicating shipping data for said piece of mail to said interchangeable postage calculating module from an external data source, said shipping data containing at least a shipping class and a shipping form for shipping said piece of mail;

storing a current fee schedule for a carrier in said interchangeable postage calculating module and calculating a postage fee, in said interchangeable postage calculating module, for shipping said piece of mail according to said current fee schedule; and supplying at least said postage fee and said shipping data from said interchangeable postage calculating module to said basic device via said serial interface.

14. A method as claimed in claim 13 comprising the additional step of, before communicating said shipping data to said interchangeable postage calculating module, communicating said shipping data to said basic device and displaying said shipping data at said basic device.

15. A method as claimed in claim 13 comprising the additional step of triggering communicating said shipping data to said interchangeable postage calculating module by entering said shipping data via said external data source.

16. A method as claimed in claim 13 wherein the step of supplying at least said postage value and said shipping data from said interchangeable postage calculating module to said basic device includes supplying auxiliary data from said interchangeable postage calculating module to said basic device for conducting a carrier-specific processing in said basic device.

17. A method for data transmission between a first basic device, a second basic device, and an interchangeable postage calculating module, comprising the steps of:

providing an interchangeable postage calculating module containing first and second serial interfaces and an internal processing unit and memory;

releasably connecting said interchangeable postage calculating module to said first basic device via said first serial interface;

releasably connecting said interchangeable postage calculating module to said second basic device via said second serial interface;

communicating a first set of data, associated with a piece of mail to be shipped, to said interchangeable postage calculating module from said first basic device via said first serial interface;

communicating a second set of data, associated with shipping said piece of mail, to said interchangeable postage calculating module from said second basic device via said second serial interface;

storing a current fee schedule for a carrier for shipping said piece of mail in said memory of said interchangeable postage calculating module;

calculating a fee for shipping said piece of mail in said internal processing unit in said interchangeable postage calculating module using said current fee table and said first and second sets of data; and supplying at least said postage fee from said interchangeable postage calculating module to said second basic device via said second serial interface.

18. A method as claimed in claim 17 comprising the step of providing a postage scale as said first basic device, and wherein said first dataset comprise weight data for said piece of mail.

19. A method as claimed in claim 17 comprising the step of providing a postage meter machine as second basic device, and wherein said second set of data comprises shipping data for said piece of mail.

20. A method as claimed in claim 17 comprising the step of providing a personal computer as second basic device, and wherein said second set of data comprises shipping data for said piece of mail.

* * * * *